L. C. THOMPSON.
TRAP.
APPLICATION FILED APR. 20, 1912.

1,052,293.

Patented Feb. 4, 1913.
2 SHEETS—SHEET 1.

Witnesses
M. F. Gannatt
John J. McCarthy

Inventor
L. C. Thompson
By Victor J. Evans
Attorney

L. C. THOMPSON.
TRAP.
APPLICATION FILED APR. 20, 1912.
1,052,293.
Patented Feb. 4, 1913.
2 SHEETS—SHEET 2.
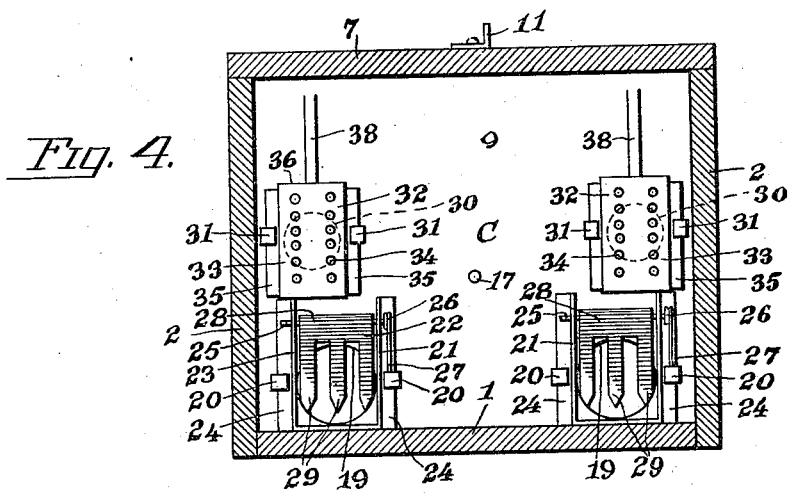
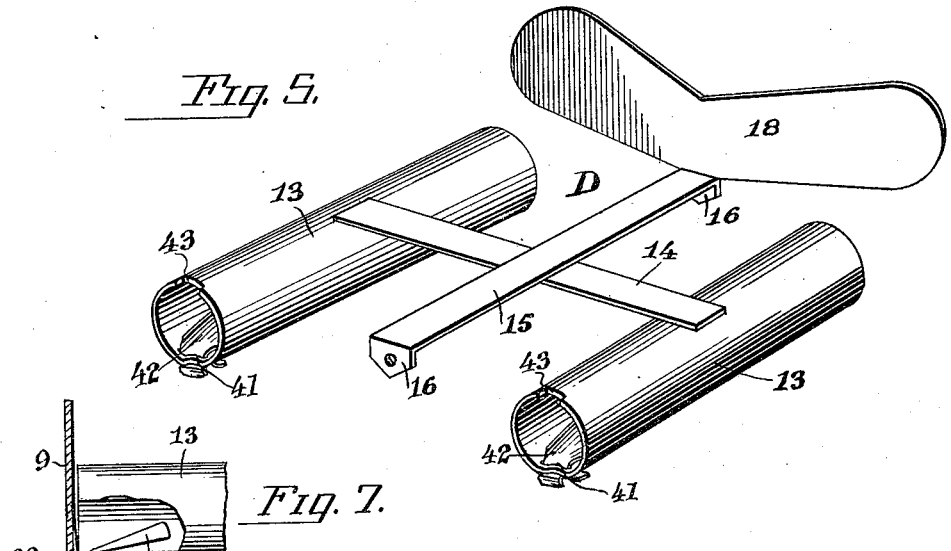
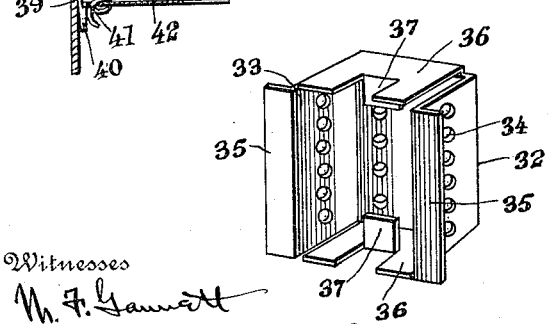
Witnesses
M. F. Gannett
John J. McCarthy
Inventor
L. C. Thompson
By Victor J. Evans
Attorney

UNITED STATES PATENT OFFICE.

LOVE C. THOMPSON, OF CANON CITY, COLORADO.

TRAP.

1,052,293. Specification of Letters Patent. Patented Feb. 4, 1913.

Application filed April 20, 1912. Serial No. 692,029.

*To all whom it may concern:*

Be it known that I, LOVE C. THOMPSON, a citizen of the United States of America, residing at Canon City, in the county of Fremont and State of Colorado, have invented new and useful Improvements in Traps, of which the following is a specification.

This invention relates to improvements in animal traps and has particular application to traps for catching rats, mice, and other small animals.

In carrying out my invention, it is my purpose to provide a trap which shall be self-setting and ever-set so that the trap may be at all times in operative or working position.

Furthermore, I aim to provide a trap which shall include a body provided with entrance and trapping compartments, a setting device being disposed in the entrance compartment and movable therein to establish communication with the trapping compartment upon an animal passing through an opening in the entrance compartment.

It is also my purpose to provide a trap which shall embody the desired features of simplicity, efficiency and durability and which may be manufactured and marketed at a relatively low cost.

With the above and other objects in view, the invention consists in the construction, combination and arrangement of parts hereinafter set forth in and falling within the scope of the appended claims.

Figure 1:
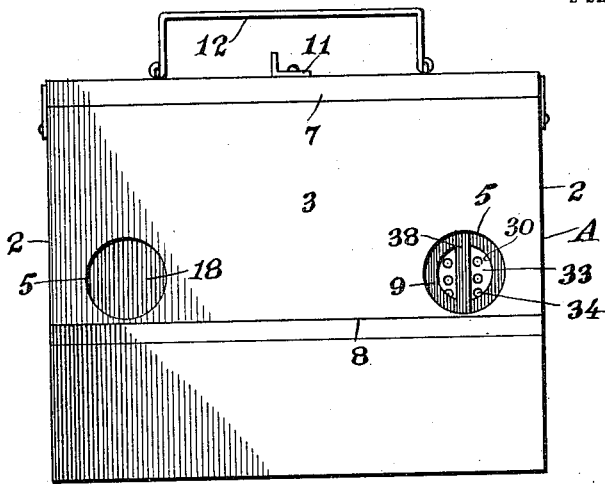
Figure 3:
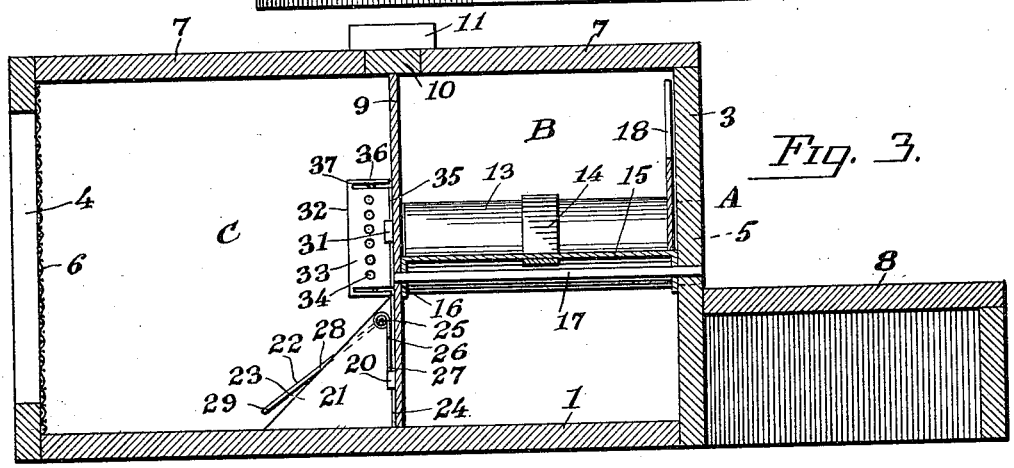
Figure 2:
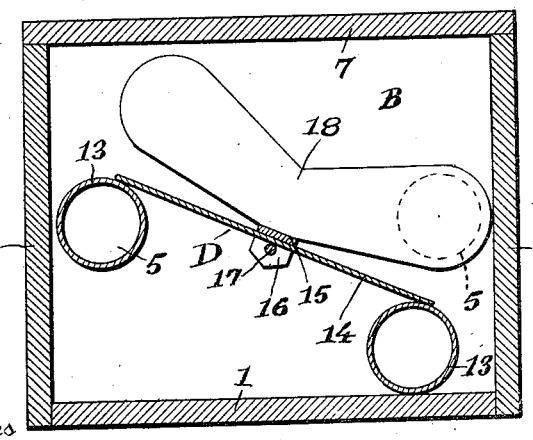

In the accompanying drawings; Figure 1 is a front elevation of a trap constructed in accordance with the present invention. Fig. 2 is a transverse sectional view through the entrance compartment. Fig. 3 is a longitudinal sectional view of the trap. Fig. 4 is a transverse sectional view through the trapping compartment. Fig. 5 is a detail perspective view of the setting device. Fig. 6 is a similar view of the bait holder, and Fig. 7 is a fragmentary side elevation of the release mechanism for the receivers, parts being broken away.

Similar reference characters designate like parts throughout the several views.

Referring now to the accompanying drawings in detail, the trap as shown includes a body A composed of a bottom wall 1, side walls 2 connected to the bottom wall in any suitable manner and extending upwardly therefrom and spaced from each other in parallel relation, and front and rear walls 3 and 4 respectively. The front wall 3 is provided with a pair of entrance openings 5 spaced from each other and arranged in the same horizontal plane and located approximately centrally of the height of the front wall, while the rear wall 4 is constructed to form a substantially square opening covered by a screen 6, or other foraminous material so that light and air may be admitted to the body. Hingedly connected to the upper surfaces of the front and rear walls are covers 7, 7 adapted to fold inwardly and toward each other and coöperating with the walls 1, 2, 3 and 4 to form a closed receptacle. Arranged forwardly of the front wall 3 of the body and connected thereto in any suitable manner is a platform 8 of a height approximately equal to the distance between the lower end of said front wall and the entrance openings 5 so that animals upon the platform may conveniently pass through the openings in the front wall.

The body A of the trap, is formed to provide two compartments B and C, the former being what I term an entrance compartment and the latter a trapping compartment. Dividing or separating these compartments is a partition 9 connected to the bottom and side walls of the body in any suitable manner and having its upper end connected to a cross piece 10, which cross piece has its opposite ends connected to the upper edges of the side walls 2 in any suitable manner and is provided upon its upper surface with a catch 11 adapted to engage the upper surfaces of the covers 7, 7 to lock the same in closed position, a bail or handle 12 being also secured to the upper surface of such cross piece to facilitate carrying or conveying the trap from one point to another.

Arranged within the entrance compartment B and movable therein is a setting device designated as an entirety by the letter D. This setting device, comprises a pair of receivers 13, 13 consisting of cylindrical metallic open ended tubes or the like and connected to each other by means of a cross bar 14 extending transversely of the entrance compartment and designed to hold one or the other of such receivers in alinement and open communication with the respective entrance opening 5.

Arranged longitudinally of the entrance compartment and centrally thereof, is a supporting bar 15 having its opposite ends downturned to provide ears 16 designed to receive a shaft 17, and intersecting the cross bar 14 and connected thereto in any suitable manner, the ears 16 permitting swinging movement of the supporting bar and consequently the receivers. Fixed to the supporting bar 15 of the setting device immediately adjacent the inner surface of the front wall 3, and movable with said supporting bar, is a shutter 18 adapted to cut off communication with the entrance openings, in the movement of the receivers away from such openings. When an animal passes through one of the entrance openings 5 and into the alining receiver 13, the latter is depressed, under the weight of the animal and thrown out of alinement with its respective opening, the shutter 18 closing the opening in the downward movement of such receiver. In the downward movement of one receiver, the other receiver is moved upwardly and in to registration with its respective entrance opening 5, the shutter closing the last-named opening being removed therefrom previous to the receiver alining therewith. Thus, it will be seen that the trap is always set and self-setting thereby insuring an operative position of the trap at all times.

Formed in the lower end of the partition 9, are a pair of spaced apertures 19 adapted to have registration with the receivers 13, 13 in the downward movement thereof so that the animals within such receivers may pass from the latter through the apertures 19 and into the trapping compartment. The partition 9, upon the trapping compartment side thereof, and at diametrically opposite points of each aperture 19, is stamped out or cut to provide fingers 20, and each pair of these fingers is designed to hold a casing 21 in alinement with the respective aperture 19, such casing being provided with a normally closed spring actuated door 22 to prevent the escape of the trapped animal. Each casing, in the present instance, consists of a single sheet of metal 23 of substantially U-shape in cross section and having its opposing limbs provided with outturned flanges 24 designed to slidably engage the fingers 20 and held into engagement with the partition by means of such fingers. The upper extremities of the opposing limbs of the U-shaped casings, are provided with alining apertures into which are inserted one limb 25 of a spring 26, the opposite limb 27 of which is fixed to one of the flanges 24, and upon the limb 25 of the spring, is fixed the door 22 so that in the opening movement of the door, the spring may be tensioned to automatically return said door to closed position after the animal has passed into the trapping compartment, the door, preferably, including a base 28 and downwardly extending pointed fingers 29.

Immediately above each aperture 19, the partition 9 is provided with an opening 30 and is formed on the opposite sides of said opening to provide fingers 31 designed to receive a bait holder 32. Each bait holder, preferably consists of a substantially rectangular receptacle 33 stamped from a single sheet of metal and formed with perforations 34 and equipped with outturned flanges 35 adapted to be disposed between the fingers 31 and the main body portion of the partition 9 so as to securely retain the bait holder in its applied position. The end walls 36, of each bait holder, are inturned to form tongues 37 designed to receive the bait and hold the same within the holder, the bait holders being arranged upon the trapping compartment side of the partition 9 and disposed in alinement with the entrance openings 5 in the front wall of the body, so that the bait may be seen and scented by the animals, when the receiver of the respective alining opening is in registration therewith. The partition 9 is also formed to provide elongated tongues 38 extending diametrically across the openings 30 and each tongue is equipped with a spring finger 39 terminating in a catch 40 disposed, normally in the path of movement of the respective receiver 13 and adapted to engage the outer surface of such receiver to hold the same in its elevated position until the rodent has approached the bait holder. Pivotally mounted within a slot 41 formed at the end of each receiver in proximity to the respective catch 40 is a trigger 42 extending inwardly and outwardly of such receiver and having its outer extremity in engagement with the catch 40. Thus, when the rodent reaches for the bait, the trigger will be contacted with and actuated to release the catch 40 whereby the elevated receiver will be released to trap the animal. Each receiver 13 at a point diametrically opposite the respective trigger has its end portion cut out, as at 43, so that each receiver in its downward movement may freely pass the respective catch, the catches being beveled toward their lower ends to facilitate the free upward movement of one receiver in the downward movement of the other.

From the foregoing description taken in connection with the accompanying drawings, the construction and mode of operation of my invention will be readily understood and while I have herein shown and described one form of my invention by way of illustration, it is to be understood that I do not limit myself to the exact details of construction herein shown and described, but that modification and variation may be made within the scope of the claims and without departing from the spirit of the invention.

I claim:

1. A trap comprising a body having a front wall provided with entrance openings, entrance and trapping compartments in said body, a partition dividing said compartments and provided with apertures in alinement with the openings in the front wall of said body, and openings designed to establish communication between the entrance and trapping compartments, doors controlling the last-mentioned openings, a bait holder carried by said partition adjacent to the apertures therein, elongated tongues carried by said partition and extending diametrically across the openings therein, a spring finger on each tongue terminating in a catch below the respective openings, a setting device adapted to establish communication between said entrance and trapping compartments by way of the last-mentioned openings in said partition and embracing a pair of cylindrical open ended tubes, each adapted to register with the respective aperture and opening in the partition and front wall of the body, a cross bar connecting said tubes, a supporting bar journaled in the entrance compartment and secured to said cross bar, each tube having a slot therein at the end adjacent to the partition, and a trigger pivoted in said slot and adapted to engage the respective catch to hold the respective tube in alinement with the aperture and opening and whereby such tube will be released under certain conditions.

2. A trap comprising a body having the front wall provided with entrance openings, entrance and trapping compartments in said body, a partition dividing said compartments and provided with apertures in alinement with the openings in the front wall of such body, and openings designed to establish communication between the entrance and trapping compartments, doors controlling the last-mentioned openings, a bait holder detachably secured to said partition adjacent the apertures therein and comprising a substantially rectangular receptacle stamped from a single sheet of metal and perforated and formed to provide outturned flanges at the side edges thereof, and inturned tongues at the ends thereof to grip the bait, and fingers at the opposite sides of each opening in the partition adapted to engage said outturned flanges to secure the respective bait holder in position, a setting device adapted to establish communication between said trapping and entrance compartments by way of the last-mentioned openings in said partition and including receivers adapted to register with the respective aperture and opening in the partition and front wall of the body, and a trigger adapted to hold the respective receiver in alinement with the apertures and openings first mentioned, whereby such receiver will be released under certain conditions.

3. A trap comprising a body having the front wall thereof provided with entrance openings spaced apart, entrance and trapping compartments in said body, a partition dividing said compartments and provided with apertures in alinement with the openings in said body, and openings designed to establish communication between the entrance and trapping compartments, doors controlling said openings, a bait holder detachably secured to said partition adjacent each aperture therein, elongated tongues carried by said partition and extending diametrically across the apertures therein, a spring finger connected to each tongue and terminating in a catch below the respective aperture, and a setting device adapted to establish communication between said entrance and trapping compartments by way of the last-mentioned openings in said partition and embodying a pair of receivers spaced apart and designed to register with the respective aperture and opening in the partition and front wall of the body, each receiver having a slot formed therein at the end adjacent the partition, a trigger pivoted in the slot and adapted to engage the respective catch, a cross bar connected to said receivers and extending transversely of the entrance compartment, a supporting bar arranged longitudinally of the receiver and intersecting the cross bar and secured thereto at the point of intersection and having the opposite ends thereof downturned to provide ears, a shaft carried by the partition and the front wall of the body and passed through the said ears, and a shutter fixed to said supporting bar and adapted to close the openings in the front wall of the body whereby in the movement of one of the receivers to establish communication between the entrance and trapping compartments, the respective opening in the body will be closed.

In testimony whereof I affix my signature in presence of two witnesses.

LOVE C. THOMPSON.

Witnesses:
R. L. PETRIE,
F. E. CRAWFORD.

Copies of this patent may be obtained for five cents each, by addressing the "Commissioner of Patents, Washington, D. C."